Dec. 14, 1965 G. A. MARSH ETAL 3,222,920
UNITARY CORROSION TEST PROBE HAVING
A TUBULAR REFERENCE SPECIMEN
Filed Dec. 19, 1961

INVENTORS
GLENN A. MARSH
BY EDWARD SCHASCHL

ATTORNEY

United States Patent Office 3,222,920
Patented Dec. 14, 1965

3,222,920
UNITARY CORROSION TEST PROBE HAVING A TUBULAR REFERENCE SPECIMEN
Glenn A. Marsh and Edward Schaschl, Crystal Lake, Ill., assignors, by mesne assignments, to Union Oil Company of California, Los Angeles, Calif., a corporation of California
Filed Dec. 19, 1961, Ser. No. 160,506
8 Claims. (Cl. 73—86)

This invention relates to corrosion probes and, more particularly, to corrosion probes characterized by simplicity of construction and rapid response to temperature fluctuations.

It is well-known that the correlation between change in electrical conductivity and change in cross-sectional area can be used in studying the influence of a corrosive environment on a metallic specimen. However, in view of the very significant effect that temperature has on electrical resistance, corrosion studies utilizing resistance measurements are unreliable unless exact compensation is made for the variations in temperature occurring in the corroding environment. Various corrosion-test probes provided with temperature-compensating elements have been proposed and used for determining surface corrosion rates. Corrosion-test probes such as described in U.S. Patents, 2,834,858, 2,851,570, 2,864,252, and 2,987,685 granted to E. Schaschl; 2,824,283 granted to L. E. Ellison; and 2,982,930 granted to J. F. Wigant, employ one exposed test specimen and a protected compensating specimen to provide automatic temperature-resistance compensation. The compensating specimen is isolated from the corrosive environment by being ensheathed in a protective coating, such as a corrosion-resistant plastic, or enclosed within a corrosive-resistant tubular case, e.g., ceramic tube, to prevent its corrosion. The resistance ratio of the two specimens changes as the exposed test specimen corrodes and its cross-sectional area is decreased. The specimens are serially connected and the extent of corrosion is measured by means of a resistance-ratio-change-measuring circuit, such as a Wheatstone bridge circuit. However, the inherent heat-insulating properties of the materials utilized to protect the compensating specimen produce an error in the corrosion measurement.

Other corrosion probes, such as disclosed by Dravnieks, U.S. Patent No. 2,735,754, have two bare specimens which are exposed to the corrosive environment. One of the specimens, instead of being coated with a corrosion-impervious material, is made much thicker than the test specimen, so that the corrosion rate of the thicker specimen differs substantially from that of the test specimen, and the rate of percentage resistance change of the specimens differs even though they corrode at the same absolute rate. The utilization of corrosion-test probes utilizing two exposed specimens of different thicknesses, which are usually fabricated from different metal stocks, suffers from the disadvantage that it is difficult to obtain specimens of the same metals or alloys having identical temperature coefficients of resistance. The employment of specimens having different temperature coefficients of resistance may produce an error in the corrosion measurement. For practical purposes, both specimens will have the same temperature coefficient of resistance only if the same stock is utilized in their fabrication. By milling a portion of the reference specimen stock to the desired dimensions of the test specimen and utilizing it as the test specimen, the same stock could be used for both the reference and the test specimens. However, it is a very difficult machining oepration to mill metal to the very small dimensions, 0.0005–0.001 inch, sometimes required for the test specimen.

Accordingly, the instant invention provides a corrosion probe for overcoming these and related deficiencies of the prior art. In accordance with our invention, both specimens of an exposed-reference-specimen-type corrosion probe are of a single-strip, metallic stock. Accurate temperature-resistance compensation is achieved by the corrosion probe of this invention since the reference specimen is exposed and both specimens have the same temperature coefficient of resistance, being of the same stock. Other advantages of the instant invention are that the corrosion probe is easier to construct than most other corrosion probes known in the art; the necessity of separately protecting the lead wires from the corrosive environment is eliminated; and one embodiment of the instant invention is especially useful for studying pitting or crevice corrosion.

It is, therefore, the primary object of this invention to provide a test probe for measurnig the corrosiveness of an environment. Another object of this invention is to provide a simple method for constructing a corrosion probe. Still another object of this invention is to provide a reference-element-type corrosion probe having accurate temperature-resistance-compensation properties. A further object of this invention is to provide an exposed-reference-specimen-type corrosion probe where both specimens have the same temperature coefficient of resistance. A still further object of this invention is to provide a method of constructing an exposed-reference-specimen-type corrosion probe utilizing a single piece of metallic stock. These and further objects of the invention will become apparent as the description herein proceeds and reference is made to the accompanying drawings in which:

Briefly, the corrosion probe of this invention is constructed from a single piece of metallic homogeneous, tubular stock, by sealing a portion of the longitudinal opening therein in fluid-tight relationship so that it serves as the reference element. The other portion, which serves as the test specimen, is adapted so that the inner and outer surfaces thereof will be exposed to the corrosive environment in which the corrosion probe is inserted. This can be done by providing a plurality of ports through the tubular wall, or cutting and opening the tubular wall. An electrical lead is then connected to a terminal end of each of the specimens, and the other terminal ends of the specimens are connected to separate conductors. The probe can then be used for measuring corrosion by inserting same within a corrosive environment and connecting the electrical leads to form an electrical bridge circuit of the Wheatstone-bridge type with the two specimens connected in separate but adjacent branches of the bridge, as described in the foregoing patents. Thus, it can be seen that the test probe of this invention is similar to the probes described in the aforementioned patents, with the difference that the reference element, which is exposd to the corrosive environment is of the same stock as the test specimen.

Figure 2:
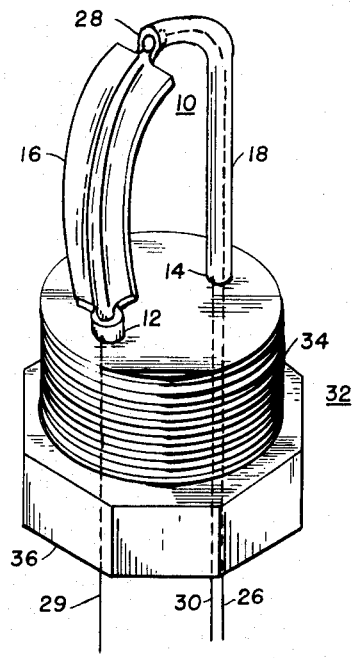
FIGURE 2 is an isometric view of the test probe depicted as being constructed in FIGURE 1.
Figure 1:
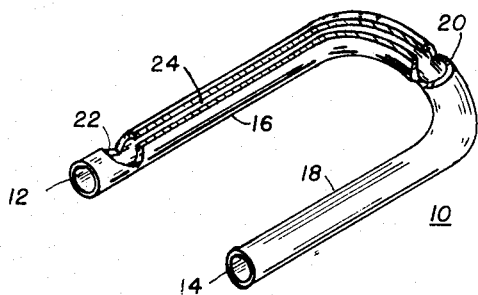
FIGURE 1 is an isometric view showing a step in the construction of an embodiment of the invention.

Referring to FIGURES 1 and 2, FIGURE 1 illustrates an intermediate step in the construction of the probe illustrated in FIGURE 2 in which tubular member 10 is bent into a substantially U-shape with ends 12 and 14. Portion 16 between the midpoint of U-shaped member 10 and end 12 is to serve as the test specimen in the completed probe while portion 18 is to serve as the reference specimen. In fabricating the embodiment shown in FIGURE 2, cuts 20 and 22 are made partially through the wall of portion 16, substantially normal to the axis thereof, near the midpoint of member 10 and end 12, respectively. A third cut 24, extending between cuts 20 and 22, is made through the wall of portion 16 which is then spread open. Inserted through portion 18 in electrically insulated relationship therewith is lead wire 26. A fluid-tight seal and an electrical junction are then created by crimping end 28 closed on lead wire 26 and/or soldering end 28 and lead wire 26. Lead wires 29 and 30 are then electrically connected, such as by soldering, to ends 12 and 14, respectively, and the entire assembly is mounted and sealed in base 32. Base 32 is made to support ends 12 and 14 and to accommodate lead wires 26, 29 and 30, which pass through base 32, in electrically insulated relationship. Base 32 is preferably provided with threads 34 for inserting the probe into a threaded opening in a process vessel, and with an octagon head 36 to accommodate a wrench which may be used to tighten the probe in place. Various materials which can be utilized for base 32 and alternative probe-support means are disclosed in the aforementioned patents.

Figure 3:
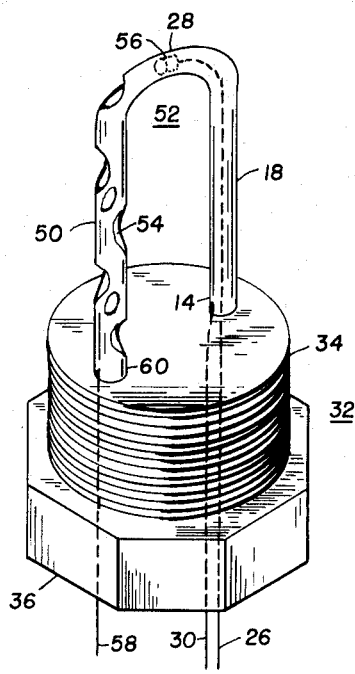
FIGURE 3 is an isometric view of another embodiment of the test probe.

Referring to FIGURE 3, an alternative embodiment of this invention is illustrated wherein section 50 of U-shaped tube 52, which serves as the test specimen, is provided with a plurality of ports 54 through the wall thereof. Lead wire 26 extends through portion 18 to end 28, where a solder connection is provided. Plug 56, which engages the inner surface of portion 18, is provided at end 28 to prevent a liquid or gaseous corrosive environment from entering the longitudinal opening of portion 18. Lead wires 30 and 58 are soldered to ends 14 and 60, respectively, of tube 52, and the entire assembly is mounted and sealed in base 32.

When the latter embodiment of this invention, having a perforated, tubular test specimen, is utilized in a flowing corrosive environment, the inner surface of the test specimen is exposed to a substantially static environment. Consequently, this embodiment has certain useful applications which corrosion probes having test specimens of other shapes, such as rods of different cross-sectional configurations, ribbon-shaped specimens, etc. do not have.

This modification is especially useful to study pitting or crevice corrosion. Since it is known that corrosion inhibitors generally are more effective in moving streams than in a static liquid, this embodiment is also useful in testing the effects of corrosion inhibitors in still pockets of a moving stream. The degree of movement of the environment within the test specimen can be varied by adjusting the size and number of ports through the wall of the test specimen.

The lengths of the test and reference specimens, and the wall thickness and diameter of the tubular stocks from which the specimens are fabricated, are not critical. For example, in some instances it may be desirable to adjust the lengths of the test and reference specimens so that they will have the same initial resistance.

It will be apparent that the test specimens must have the property of conducting electricity and show a change in resistance which is proportional to changes in cross-sectional area due to corrosion. Materials that meet these requirements include all metal and metal alloys, such as steel, iron, bronze, brass, copper, and the like. The environment to be investigated by the corrosion probes of this invention can be in any physical state, or may exist as a mixture of substances in different physical states. The corrosive environment may be gaseous, vaporous, liquid, solid, or semi-solid, or a mixture of these forms of matter. Examples include corrosive gases, such as the halogens, water, brines, acid or base solutions, flue gases, and mixtures of gases or carrier liquids containing a high content of solids, such as catalyst particles. These environments may be considered to be corrosive either because of their mechanical or chemical effects or combinations of same which result in loss of portions of the exposed specimens. An example of a corrosive liquid environment would be an acid solution, or an ammonia-ammonium nitrate fertilizer solution.

Although our invention has been described in relation to specific embodiments, it will be apparent that obvious modifications can be made by one skilled in the art without departing from the intended scope of this invention. For example, while the specimens have been described as being fabricated from tubular material they may be constructed from ribbon-like materials which can be formed into a tubular shape. It will be evident that the test and reference specimens of the probe need not be U-shape. The specimens can be fabricated from tubular, corrodible, electrically conductive material of any cross-section, such as circular, rectangular, square, hexagonal, octagonal, etc. Although it is preferred that the lead wire from the junction of the specimens extends through the sealed reference specimen for protection of the lead wire and structural strength of the reference specimen, it is not essential that the lead wire be so located. If the lead wire is extended to the reference specimen, the reference specimen need not be hollow but may be of the form of a flattened tube.

The embodiments of this invention in which an exclusive property or privilege is claimed are defined as follows:

1. A corrosion-measuring device for use in a corrosive environment comprising a continuous, homogeneous, corrodible, electrically conductive material of tubular cross-section, the longitudinal opening in a first portion of said tubular material being fluid-tightly sealed at the ends thereof, a second portion of said tubular material having a plurality of ports through the wall thereof, whereby the interior surface of said second portion is contacted by the corrosive environment, and an end adjacent to an end of said first portion, and electrical conductor means electrically connected to the terminal ends of said portions.

2. A device in accordance with claim 1 in which said tubular material is U-shaped.

3. A device in accordance with claim 2, in which one electrical conductor means is electrically connected to said tubular material where said first and second portions are adjacent to each other, and second and third electrical conductor means are electrically connected to the other ends of said portions, respectively.

4. A device in accordance with claim 3 in which said first-named electrical conductor means extends through the longitudinal opening in said first portion in electrically insulated relationship therewith.

5. A device in accordance with claim 4 wherein the ports in the wall of the second portion of said tubular member are sufficient in size and number to permit a substantially static corrosive environment at said interior surface.

6. A corrosion-measuring device for use in a corrosive environment comprising a first specimen of tubular cross-section having the longitudinal opening therein fluid-tightly sealed at the ends thereof whereby the inner surface of said tubular specimen is isolated from said corrosive environment, a second ribbon-like specimen conjunct with said first specimen, said specimens being fabricated of an undivided, homogeneous piece of an electrically conductive material, the exposed surfaces of said specimens being adapted to contact the same corrosive environment, and electrical conductor means electrically connected to the terminal ends of said specimens.

7. A device in accordance with claim 6 in which a first electrical conductor means is electrically connected to said first specimen where it is conjunct with said second specimen, and second and third electrical conductor means are electrically connected to the other ends of said specimens, respectively.

8. A device in accordance with claim 7 in which said first-named electrical conductor means extends through the longitudinal opening in said first specimen in electrically insulated relationship therewith.

References Cited by the Examiner

UNITED STATES PATENTS

| | | | |
|---|---|---|---|
| 2,861,160 | 11/1958 | Hersh | 29—155.62 |
| 2,986,805 | 6/1961 | Jonke | 29—155.62 |
| 2,991,439 | 7/1961 | Marsh et al. | 73—86 X |
| 2,994,219 | 8/1961 | Schaschl | 73—86 |
| 3,015,950 | 1/1962 | Doctor et al. | 73—86 |
| 3,067,386 | 12/1962 | Freedman | 73—86 X |
| 3,098,991 | 7/1963 | Wolber | 73—86 X |
| 3,104,355 | 9/1963 | Holmes et al. | 73—86 X |

RICHARD C. QUEISSER, *Primary Examiner.*

ROBERT L. EVANS, DAVID SCHONBERG,
*Examiners.*